May 19, 1931. R. H. FRISBIE 1,805,818
MANURE LOADER
Filed Jan. 20, 1930 3 Sheets-Sheet 1
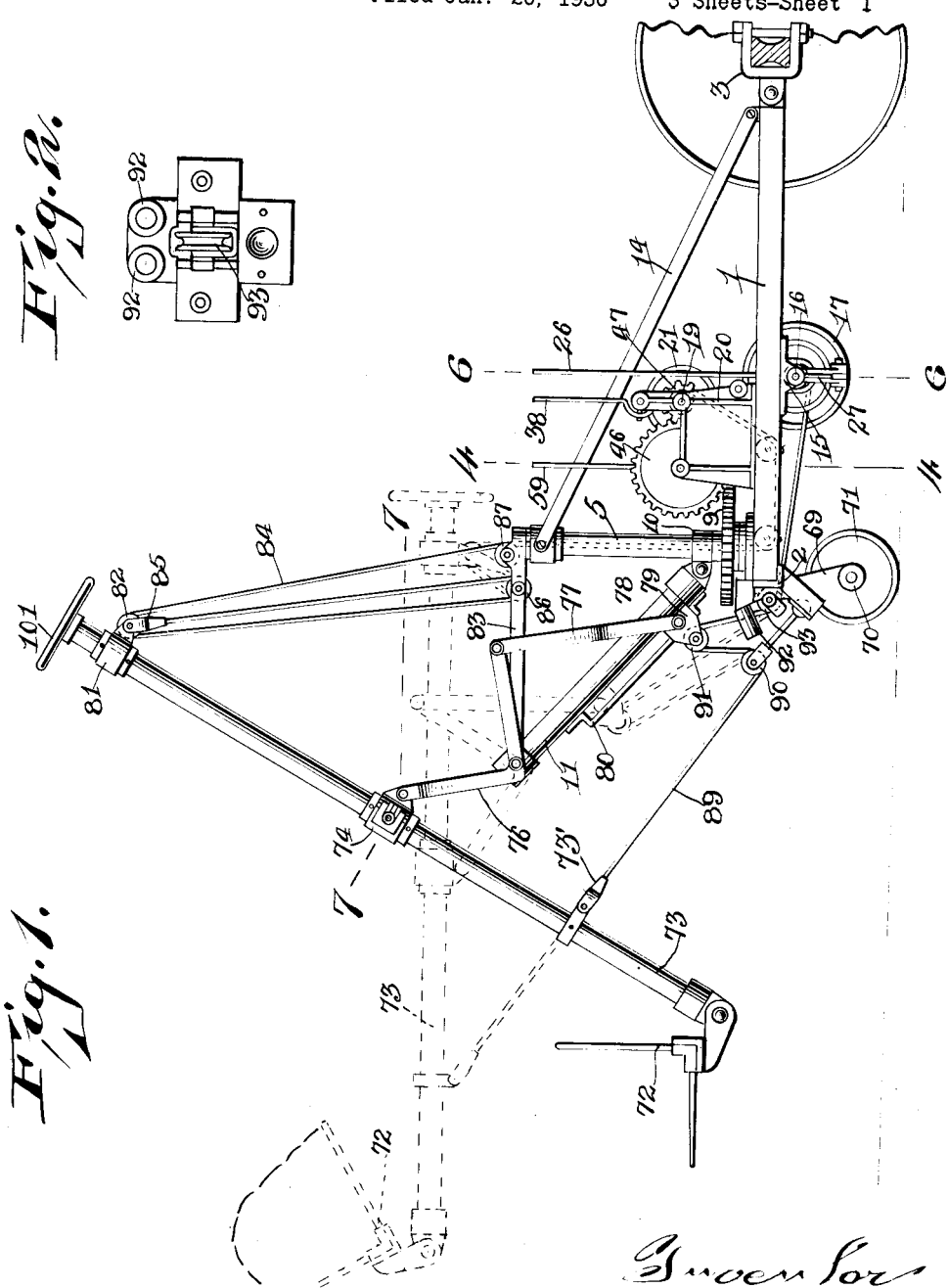

May 19, 1931.  R. H. FRISBIE  1,805,818
MANURE LOADER
Filed Jan. 20, 1930    3 Sheets-Sheet 2

May 19, 1931.  R. H. FRISBIE  1,805,818
MANURE LOADER
Filed Jan. 20, 1930    3 Sheets-Sheet 3

Inventor
R. H. Frisbie

Patented May 19, 1931

1,805,818

UNITED STATES PATENT OFFICE

RAYMOND H. FRISBIE, OF KEWAUNEE, WISCONSIN

MANURE LOADER

Application filed January 20, 1930. Serial No. 422,172.

This invention relates to new and useful improvements in manure loaders.

One of the objects of my invention is the provision of an improved machine of the above type wherein the device can be used for lifting and conveying manure or similar material from any location, to a wagon or other type of conveying vehicle and is manually controlled and adapted to be attached to any suitable type of tractor vehicle for moving the device from place to place.

Another object of my invention is the provision of a manure loader which could be used equally as well for digging up earth and other material and which consists of a traction supported frame adapted to be attached to a tractor or similar tractive vehicles, with the operating mechanism mounted upon the frame and a pivotally mounted fork supported by the frame and connected to the operating mechanism upon the frame, whereby this fork can be moved to various number of positions for scooping up or removing a pile of material and conveying the material to one side of the frame and depositing the same in a conveyor or on the ground as the case may require.

A further object of the invention is the provision of a manure loader which includes a main supporting standard, upon which is mounted a movable standard adapted to be raised for picking up, conveying and dumping material to various positions, and wherein all of the movement of the movable members are manually operated from mechanism supported upon the main frame.

With the above and other objects in view, the invention consists in the novel features of construction, the combination and arrangements of parts hereinafter more fully set forth, pointed out in the claims and shown in the accompanying drawings wherein:

Figure 1 is a side elevation illustrating my improved manure loader with the fork in elevation illustrated by dotted lines;

Figure 2 is a bottom plan view of one of the pulleys and guide rollers for the cable used in illustrating the fork;

Figure 3:
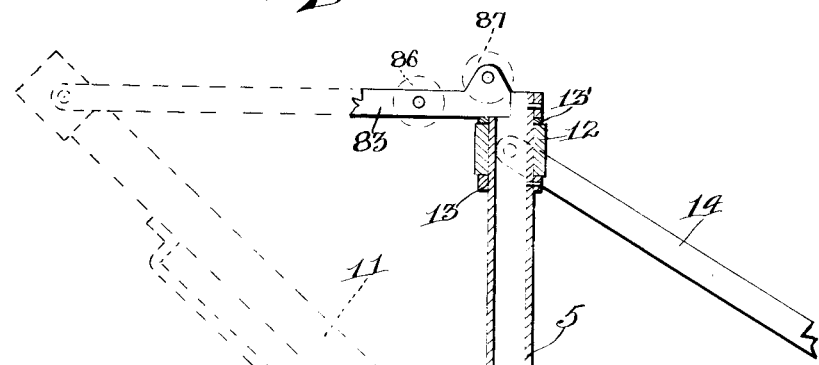
Figure 3 is a vertical view through the main supporting standard, illustrating the relative position of the inclined supporting standard in dotted lines.

Referring more particularly to the drawings, it will be noted that the frame which forms the support for my improved loader comprises longitudinal side members 1 connected at one end by means of a transverse cross piece 2, while any suitable means may be used for connecting the other ends of the side members so that they can be attached to a tractor or similar vehicle by means of a yoke 3.

A tranverse member 4 forms the main support for the tubular upright 5. The lower end of this tubular upright 5 extends downwardly into an opening in the transverse member 4 and surrounding the tubular upright adjacent its lower end is a bearing plate 6 having a similar bearing plate 7 arranged in opposed relation thereof. Both of these bearing plates 6 and 7 are provided with opposed raceways to receive the bearings 8. Attached to the tubular upright 5 above the bearing plates 6 and 7, is a gear 9 and directly above the gear 9 is a clamp 10 to which is pivotally secured the inclined upright 11.

The upper end of the tubular upright 5 is retained against lateral movement by having a collar 12 arranged thereon between the two rings 13 and 13', which limit the movement of the collar and this collar has connected thereto the brace members 14, which project rearwardly of the frame and are secured in any suitable manner to the two side members 1.

Suspended by suitable bearings 15 attached to the lower sides of the side frames 1, is a shaft 16 which forms the main drive shaft for the device. One end of tis shaft extends beyond the frame and has a pulley 17 mounted thereon which may be connected by means of a belt or other suitable device for conveying power to the shaft 16.

Between one of the bearings 15, is a sprocket 18 over which a chain may pass for driving the shaft 19 supported by the upright bearings 20, shaft 19 having a sprocket 21 thereon over which the sprocket chain passes so that movement is imparted to shaft 19 from the sprocket 18 on shaft 16.

Mounted on shaft 16 is a drum 22 which carries the female part 23 of a suitable clutch, the male part 24 being slidably mounted upon the shaft and has attached thereto a sleeve 25 to which is connected an operating lever 26. The lower end of lever 26 is pivotally mounted upon the bracket 27 extending inwardly from one side of the frame.

Figure 6:
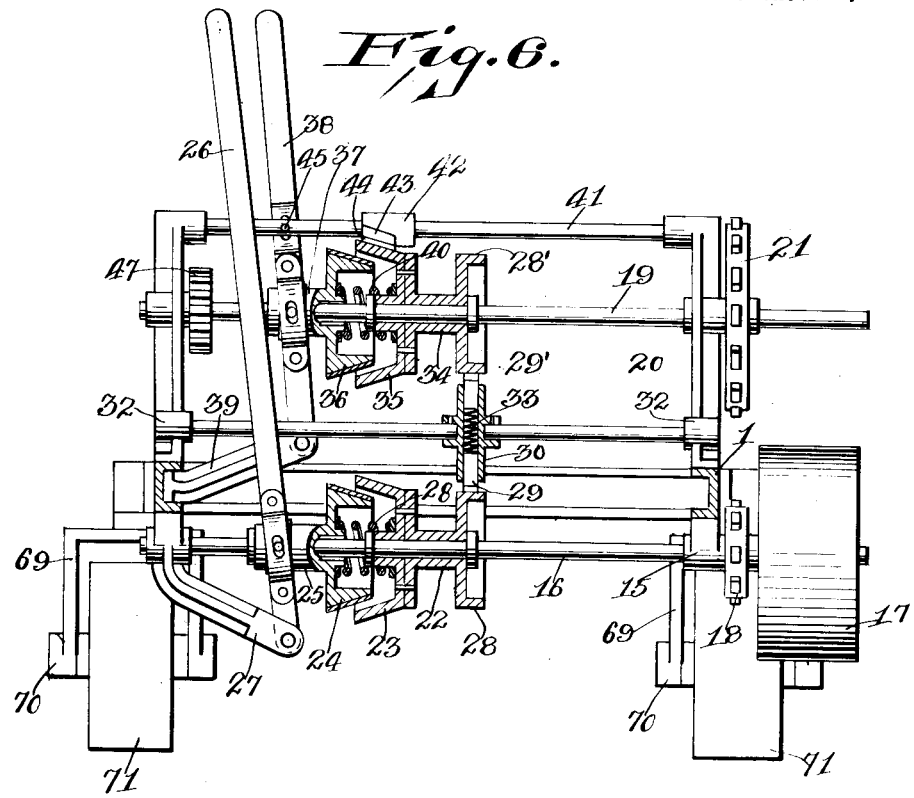
Figure 6 is a sectional view on the line 6—6 of Figure 1.

Between the two clutch parts 23 and 24, there is arranged an expansion spring 28 for normally urging these clutch members apart, their normal position being illustrated in Figure 6. The drum 22 carries at one end opposite the clutch member 23, a brake drum 28 adapted to be engaged by the shoe 29, slidably mounted in the tubular member 30 on rod 31. The ends of rod 31 are mounted in suitable bearings 32 formed in a portion of the upright standards 20. Within the tubular member 30 is a coil spring 33, the ends of which bear against the two braking shoes 29 and 29', the shoe 29' normally bearing against the braking surface 28' on drum 34 which is mounted on shaft 19.

Drum 34 has attached to one end thereof the female part 35 of a clutch, while the male part 36 is slidably mounted on shaft 19 and carries a sleeve 37 to which is attached an operating lever 38. Operating lever 38 is pivotally mounted upon a bracket 39 supported by one of the longitudinal side members 1 of the frame. Arranged between the clutch members 35 and 36 is an expansion spring 40 which normally retains the clutch members 35 and 36 in inoperative spaced relation, as shown in Figure 6.

Arranged above shaft 19 is a supporting rod 41 mounted in the upper ends of the bearing standards 20 and this rod carries a sleeve 42 having a projection 43 adapted to cooperate with a projecting part 44 on the exterior of the clutch member 35. The rod 41 is mounted for sliding axial movement and is connected by means of pin 45 to the operating lever 38 so that when lever 38 is moved to the right, as shown in Figure 6, to bring the clutch members 35 and 36 into operative engagement, the sleeve 42 will be moved so that the projection 43 will be moved out of the path of the member 44 and permit drum 34 to rotate. However, when the lever 38 is released, the rod 41 is again moved axially to bring the projection 43 into the path of the member 44, stopping the rotation of clutch member 35 and drum member 34.

Supported at the edge of the bearing standard 20 opposite the shaft 19, is a shaft 45 carrying a gear 46 adapted to mesh with pinion 47 on shaft 19 in order to impart movement to shaft 45. Shaft 45 controls the rotative movement of the tubular upright 5 through the medium of suitable clutches operated by shaft 45.

Supported upon the frame of the device is a base member 48 and extending upwardly from this base member is a vertically disposed standard 49 upon which a sleeve 50 is rotatably mounted. The sleeve 50 carries a pinion 51 adapted to mesh with the gear 9 on tube 5 and at the upper end of the sleeve 50 is a bevel gear 52 adapted to mesh with the bevel pinions 53 and 53'.

Pinion 53' has attached thereto the female clutch member 54 and keyed to the shaft 45 is the male clutch member 55 adapted to cooperate with clutch 54 for imparting rotative movement to bevel gear 53' to rotate sleeve 50 and pinion 51 in one direction. The sleeve 56 which carries clutch member 55 is not only keyed to shaft 45 but is also slidably mounted thereon and is connected by means of a yoke 57 to link 58 which in turn is connected to the hand lever 59.

Bevel gear 53 has attached thereto the female clutch member 60 and slidably mounted upon and keyed to shaft 45 is sleeve 61 which carries the male clutch member 62 adapted to cooperate with clutch member 60 for imparting rotative movement to bevel pinion 53 which in turn will rotate sleeve 50 in a direction opposite to that by which it may be rotated through the medium of bevel pinion 53'.

Figure 4:
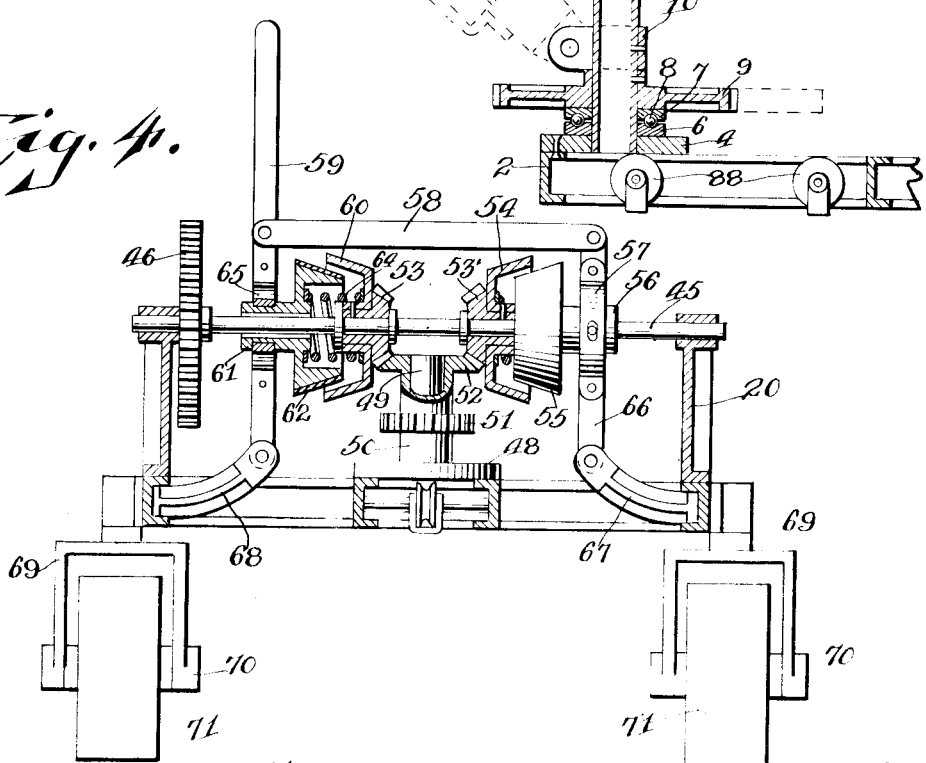
Figure 4 is a transverse section on the line 4—4 of Figure 1.
Figure 5:
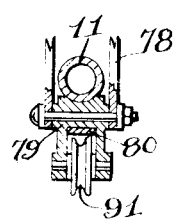
Figure 5 is a detail section through the inclined standard and the movable pulley support mounted upon the inclined standard.

Arranged between the two clutch members 60 and 62, is an expansion spring 64 adapted to normally urge these two clutch members apart, as shown in Figure 4. Sleeve 61 is connected by means of a yoke 65 to an operating lever 59 whereby, through the medium of lever 59, either one of the clutches operating bevel pinions 53 and 53' may be actively engaged in order to impart rotative movement to sleeve 50.

The yoke 57 is carried by a supporting arm 66, pivotaly mounted upon a bracket 67, carried by one of the longitudinal side members of the frame. The lower end of lever 59 is pivotally mounted upon a bracket 68 carried by the other longitudinal side of the frame, whereby when one of the clutches is in operation, the other will be positively disengaged.

At this time, it might be well to call attention to the fact that at the forward end of the frame, I pivotally mount the yokes 69 having bearings 70 at their outer ends for supporting the trunnions of wheels 71, whereby the forward end of the frame may be properly supported so that the device can be conveyed from place to place when attached to any suitable type of traction vehicle.

The scoop member which in the present instance is illustrated as a fork 72 is attached to the lower end of the movable arm 73. This movable arm is preferably tubular in construction, as illustrated, in order to provide sufficient strength for lifting comparatively heavy loads and attached to the arm 73, approximately midway of its length, is a collar 74 having a laterally projecting arm 75 which is pivotally connected to a bell crank 76.

Bell crank 76 has its opposite end pivotally connected to lever 77 which is provided at its lower end with the yoke 78 adapted to straddle the movable member 11 and the ends thereof are pivotally connected to a sliding block 79 which is mounted upon a guide bar 80 attached to the under side of member 11, as shown in Figure 1.

Adjacent the upper end of arm 73 there is rotatably mounted a collar 81 having laterally disposed lugs between which is mounted a pulley 82. The member 11 is connected to the upper end of the tubular standard 5 by means of a U-shaped member 83, the intermediate portion of which embraces the upper end of tubular member 5, while the ends are connected to the outer end of member 11, as will be clearly noted in Figure 7.

The outer end of arm 73 is raised by means of a cable 84. This cable 84 has one end attached to the trunnions of pulley 82 by means of a yoke 85, as shown in Figure 1, and the cable then extends down around a pulley 86 mounted between the parallel sides of member 83 and then extends upwardly over pulley 82. The cable after passing over pulley 82 passes over a pulley 87, mounted between the parallel side portions of member 83 at a point adjacent the upper end of standard 5, so that the cable will pass down through standard 5 where it is then trained over two aligned guide pulleys 88 carried by the frame and after passing over guide pulleys 88, it passes upwardly and around the drum 34.

Attached to the arm 73 adjacent its lower end is a cable 89, this cable passes around a loosely mounted pulley 90 and thence around pulley 91 carried by block 79 and after passing block 79 it passes between the guide rollers 92 and thence over pulley 93. Cable 89 after passing over pulley 93 extends rearwardly and is wound upon drum 22. From this, it will be apparent that by engaging clutch members 35 and 36, drum 34 will be rotated to wind up cable 84 and raise the scoop or fork 72 at the outer end of arm 73 to the dotted line position, shown in Figure 1, and if it is desired to swing the load to either side of the machine, either one of the clutches on shaft 45 may be thrown into operation for rotating the tubular member 5. After the load has been dumped, the fork can be returned to its normal position with the frame and thence moved to a lowered position by engaging clutch members 23 and 24 to wind cable 89 on drum 22.

Figure 7:
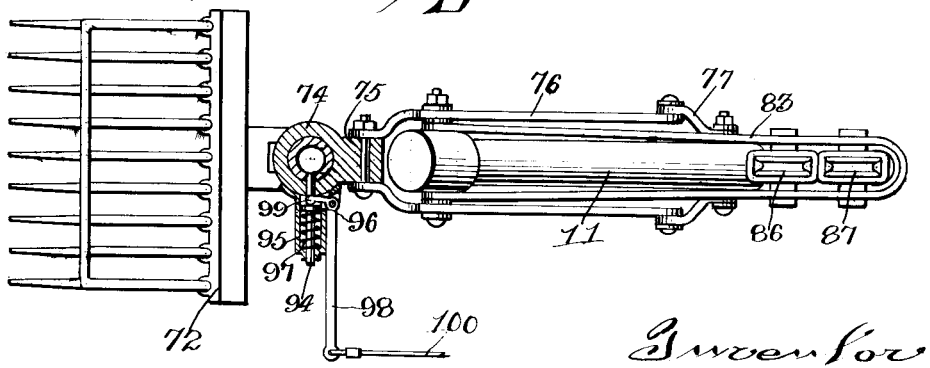
Figure 7 is a sectional view on the line 7—7 of Figure 1.

Normally, arm 73 is retained against rotative movement within collar 74 by means of a pin 94 which is slidably mounted within a housing 95 with its inner end projecting into a suitable opening in arm 73, as shown at Figure 7. The housing and pin are carried by sleeve 74 which is non-rotatable and pin 94 carries a plate 96 with a coil spring 97 mounted on pin 94 and positioned between plate 96 and the closed outer end of housing 95 in order to normally maintain the pin in locking position.

Pivotally mounted on the housing 95 is a lever 98 having an inturned end 99 which bears against plate 96, and this lever 98 has attached to its outer end a cord 100 which may lead forward to any convenient location on the frame so that the same will be handy to an operator and from this operation, by pulling on cord 100, the pin 94 can be withdrawn from the opening in arm 73 in order to permit arm 73 to rotate. There is no traction power for rotating arm 73, it being understood that the weight of the load on the scoop or fork will be sufficient to cause rotation of arm 73 for dumping the load from the fork and the fork will be returned to its normal position as soon as drum 22 is rotated to exert a pull on cable 89, pin 94 going back into locking position upon rotative movement of the arm 73.

At the extreme upper end of arm 73, I mount a hand wheel 101, whereby arm 73 can be rotated manually if the case may require.

It will be noted that by mounting arm 73 to the bell crank 76 and connecting the inner end of the bell crank 76, with block 79 by means of lever 77, when the outer end of arm 73 is being raised by means of cable 84, it is not only to be moved toward an elevated position, but is pushed forwardly so as to have a tendency to scoop up as much material as possible during the time the fork is being moved. Thus arm 73 is not only mounted for direct tilting movement, but is mounted for longitudinal or axially movement as well, and this is quite advantageous in picking up manure or similar material and helps to load to its fullest extent while being raised.

Attention is directed to the fact that when cables 89 and 84 are being unwound from their respective drums 22 and 34, the brake shoes 29 and 29' will engage the braking surfaces 28 and 28', in order to take up any slack in these cables so that they will not unwind too fast and become tangled as would be the case if there was retarding movement applied to the drums.

It will be noted in Figure 1 that the cable 89 is connected to arm 73 through the medium of a short arm 73' pivotally mounted so as to provide for leverage when arm 73 is rotated back to normal position after the load has been dumped, and when drum 22 is operated to bring the fork back for another load. The bell crank 76 is pivotally mounted slightly off center, as shown in Figure 1, so that arm 73 will drop as soon as pull is released on cable 84. However, during the time the arm 73 is being pulled backward toward the machine, the bell crank 76 operates to cause arm 73 to raise in order to provide for clearance to the fork during its backward movement so that it will readily assume its proper position with respect to the material which is being loaded.

While I have shown and described this machine as mounted upon a specific type of frame with traction wheels, it will be apparent that it can be easily mounted on any suitable type of support.

While I have shown and described the preferred embodiment of my invention, it will be apparent that slight changes may be made in the construction when putting the invention into practice without departing from the spirit of the same or the scope of the appended claims.

I claim:

1. A device of the class described including a traction supported frame, an upright carried thereby, means for imparting rotating movement to said upright, an inclined supporting member connected with the upright, a bell crank at the outer end of the inclined supporting member, a movable arm pivotally mounted on one end of the bell crank, a fork member carried by one end of said arm and normally disposed in a lowered position, means for raising the fork supporting end of said arm and means for returning said arm to its normal position.

2. In a device of the class described, a traction supported frame, a rotatable standard carried by the frame, means for imparting rotative movement to said standard in either direction, an inclined upright carried by the standard, a slide member movably supported by the upright, a bell crank at the outer end of the upright, a movable arm pivotally connected to one end of said bell crank, means for raising and lowering one end of said arm, and means forming connection between the bell crank and the slide block, operating in conjunction with means connected to the movable arm for imparting a forward movement to one end of said arm during the raising thereof.

3. A device of the class described including a traction supported platform, a rotatable standard supported by the platform, an inclined upright carried by the standard, a bell crank pivoted to the outer end of the inclined upright, a movable arm pivotally mounted upon the outer end of the bell crank, a driving shaft, means forming connection between the driving shaft and the standard for rotating the same in either direction, a slidable member carried by the inclined upright, an arm connecting the slidable member with the other end of the bell crank, a pulley carried by the slidable member, a drum carried by the driving shaft, means for raising one end of said arm and a cable connected to the arm and passing over the pulley on the slidable member and adapted to be wound upon the drum whereby to lower said arm.

In testimony that I claim the foregoing I have hereunto set my hand at Kewaunee, in the county of Kewaunee and State of Wisconsin.

RAYMOND H. FRISBIE.